United States Patent
Chen et al.

(10) Patent No.: US 10,992,426 B2
(45) Date of Patent: Apr. 27, 2021

(54) DATA PROCESSING METHOD, DEVICE AND NODE

(71) Applicant: ZTE CORPORATION, Guangdong (CN)

(72) Inventors: Zewei Chen, Guangdong (CN); Jun Xu, Guangdong (CN); Jin Xu, Guangdong (CN)

(73) Assignee: ZTE Corporation, Guangdong (CN)

( * ) Notice: Subject to any disclaimer, the term of this patent is extended or adjusted under 35 U.S.C. 154(b) by 118 days.

(21) Appl. No.: 16/322,745

(22) PCT Filed: Aug. 10, 2017

(86) PCT No.: PCT/CN2017/096760
§ 371 (c)(1),
(2) Date: Apr. 3, 2019

(87) PCT Pub. No.: WO2018/028622
PCT Pub. Date: Feb. 15, 2018

(65) Prior Publication Data
US 2019/0386792 A1    Dec. 19, 2019

(30) Foreign Application Priority Data
Aug. 10, 2016    (CN) .......................... 201610654195.0

(51) Int. Cl.
*H04J 1/16* (2006.01)
*H04L 1/20* (2006.01)
(Continued)

(52) U.S. Cl.
CPC ........... *H04L 1/201* (2013.01); *H04B 17/336* (2015.01); *H04L 1/1819* (2013.01)

(58) Field of Classification Search
CPC .................................................... H04L 1/1819
See application file for complete search history.

(56) References Cited

U.S. PATENT DOCUMENTS 7,296,205 B2    11/2007    Curcio
7,864,745 B2    1/2011    Cai
(Continued)

FOREIGN PATENT DOCUMENTS

| CN | 1630227 A | 6/2005 |
|---|---|---|
| CN | 101026440 A | 8/2007 |
| WO | 2005078983 A1 | 8/2005 |

OTHER PUBLICATIONS

International Search Report dated Oct. 27, 2017 for International Application No. PCT/CN2017/096760, 5 pages.
(Continued)

*Primary Examiner* — Bo Hui A Zhu
(74) *Attorney, Agent, or Firm* — Knobbe, Martens, Olson & Bear, LLP

(57) ABSTRACT

Provided are a data processing method, device and node. The method includes: a second node determines that a first data sent from a first node exhibits data erasure; the second node sends feedback information to the first node, where the feedback information includes one of the following: an erasure rate, an erasure rate and an erasure position, the erasure rate is a proportion of resources that exhibit data erasure in resources corresponding to the first data, and the erasure position is a position of the resources that exhibit data erasure in the resources corresponding to the first data; the second node receiving a second data as determined according to the feedback information by the first node; the second node performs decoding according to the first item of data and the second data.

16 Claims, 7 Drawing Sheets

(51) Int. Cl.
*H04B 17/336* (2015.01)
*H04L 1/18* (2006.01)

(56) References Cited

U.S. PATENT DOCUMENTS

| | | |
|---|---|---|
| 8,108,747 B2 | 1/2012 | Curcio |
| 2004/0010736 A1 | 1/2004 | Alapuranen |
| 2005/0135253 A1 | 6/2005 | Cai |
| 2005/0182995 A1 | 8/2005 | Curcio |
| 2007/0260957 A1 | 11/2007 | Soljanin et al. |
| 2008/0065945 A1 | 3/2008 | Curcio |
| 2010/0146355 A1* | 6/2010 | Jiang .................... H04L 1/1671 714/749 |
| 2018/0295612 A1* | 10/2018 | Yi ......................... H04L 5/0053 |
| 2018/0375622 A1* | 12/2018 | Karlsson ................ H04W 4/70 |

OTHER PUBLICATIONS

Written Opinion of the International Searching Authority dated Oct. 27, 2017 for International Application No. PCT/CN2017/096760, 3 pages.

European Search Report dated Aug. 22, 2019 for EP Application No. 17838752.8, 7 pages.

\* cited by examiner

A first node receives feedback information sent from a second node, where the feedback information includes one of: an erasure rate, and the erasure rate and an erasure position, the erasure rate is a proportion of resources that emerge data erasure in resources corresponding to a first data, and the erasure position is a position of the resources that emerge data erasure in the resources corresponding to the first data ⟶ S402

The first node determines second data according to the feedback information, and sends the second data to the second node, where the second data is configured for performing decoding together with the first data sent from the first node ⟶ S404

FIG. 4

DATA PROCESSING METHOD, DEVICE AND NODE

CROSS-REFERENCE TO RELATED APPLICATIONS

This application is a United States national phase application of co-pending international patent application number PCT/CN2017/096760, filed on Aug. 10, 2017 which claims priority to a Chinese patent application No. 201610654195.0 filed on Aug. 10, 2016, disclosures of both of which are incorporated herein by reference in their entireties.

TECHNICAL FIELD

The present disclosure relates to the field of communications and, in particular, to a data processing method, device and node.

BACKGROUND

Two technologies are used in wireless communication systems to control transmission errors: forward-error-control (FEC) and auto-repeat-request (ARQ) methods. The FEC uses an error correction code, which cannot guarantee that a transport block can always be decoded correctly, so it is difficult to obtain high system reliability. The ARQ uses a code with strong error detection capability. When a receiving end detects a data error, the receiving end notifies a sending end of the data error via feedback signaling, and the sending end resends the transport block until the transport block is correctly received. The ARQ provides high system reliability at the expense of certain transmission delay, signaling overhead, and error detection redundancy. A combination of the FEC and the ARQ technologies is a Hybrid-ARQ (HARQ) technology. The HARQ guarantees system reliability and controls the transmission delay, signaling overhead and error detection redundancy.

The HARQ technology is adopted in the long term evolution (LTE) system. The receiving end first performs decoding on the error correction code of the transport block, and detects the decoding result. If the detection result is correct, the acknowledgement (ACK) message is fed back; otherwise, the negative acknowledgement (NACK) message is fed back. When the sending side receives the NACK information, the corresponding transport block data is retransmitted until the transport block is correctly received; and when the sending side receives the ACK information, the transmission of the transport block ends.

In future communication systems such as the fifth generation wireless communication, some important application scenarios such as enhanced mobile broadband (eMBB) require ultra-high peak rates, such as 20 Gbps. Correspondingly, a large transport block size will be required, and meanwhile a transport block may include many smaller code blocks. Long transport blocks are to be transmitted on larger time and frequency resources. Due to small-scale fading of the channel or other burst interference, different code blocks of a certain transport block or data on different time-frequency resources will experience quite different channel conditions. When the channel conditions are very poor, the corresponding data has little effect on decoding, or is even erased, which increases the possibility of decoding errors. According to the existing HARQ technology, when a decoding error occurs, the entire transport block will be retransmitted, which will bring a great waste of resources in the eMBB scenario, and also increase the decoding complexity and the transmission delay.

Therefore, in the related art, when a decoding error occurs in a transport block, the entire transport block is retransmitted, which causes a waste of radio resources, and increases decoding complexity as well as transmission delay.

SUMMARY

Embodiments of the present disclosure provide a data processing method, device, and node, to at least solve the problem, in the related art, that when a decoding error occurs in a transport block, the entire transport block is retransmitted, which causes a waste of radio resources, and increases decoding complexity as well as transmission delay.

An embodiment of the present disclosure provides a data processing method. The method includes: determining, by a second node, that first data sent from a first node emerges data erasure; sending, by the second node, feedback information to the first node, where the feedback information includes one of: an erasure rate, and the erasure rate and an erasure position, the erasure rate is a proportion of resources that emerge data erasure in resources corresponding to the first data, and the erasure position is a position of the resources that emerge data erasure in the resources corresponding to the first data; receiving, by the second node, second data determined according to the feedback information by the first node; and performing, by the second node, decoding according to the first data and the second data.

Optionally, the second node determines that the first data sent from the first node emerges the data erasure when at least one of following is checked by the second: an equivalent received signal to interference plus noise ratio (SINR) of a signal on the resources corresponding to the first data being less than a first predetermined threshold T1; a sum of interference and noise power on the resources corresponding to the first data being greater than a second predetermined threshold T2; and a signal power on the resources corresponding to the first data being lower than a third predetermined threshold T3. T1, T2, and T3 are real numbers.

Optionally, the resources corresponding to the first data and resources corresponding to the second data include one of: a time-frequency domain resource, a transport layer, an antenna port, and a carrier, where the time-frequency domain resource is defined by a time-domain resource having a length of N1 and a frequency-domain resource having a length of N2, and N1 and N2 are positive integers.

Optionally, a length of the time-domain resources includes: a length of one of an orthogonal frequency division multiplexing (OFDM) symbol, a time slot, a subframe and a radio frame occupied in time-domain; and the length of the frequency-domain resources includes a length of one of a subcarrier, a resource block (RB) and a subband occupied in the frequency-domain resource.

Optionally, the time-frequency domain resource includes one of: a resource unit (RU), a resource block (RB), and a subband.

Optionally, the resources corresponding to the first data are divided into Mj mutually exclusive resource index sets according to the jth resource granularity, one of the Mj mutually exclusive resource index sets is an erasure position, Mj erasure positions form an erasure position set j, j is a positive integer and j≤J, J is the number of erasure position sets corresponding to preset J types of resource granularity, and J is a positive integer.

Optionally, in condition that the number of resource indices in the erasure position is greater than 1, the resource indices are continuous.

Optionally, the second data is one of N redundancy versions of data, where the redundancy versions are determined according to one of: a preset erasure rate, and a combination of the preset erasure rate and a preset erasure position, and N is a positive integer.

Another embodiment of the present disclosure provides a data processing method. The method includes: receiving, by a first node, feedback information sent from a second node, where the feedback information includes one of: an erasure rate, and the erasure rate and an erasure position, the erasure rate is a proportion of resources that emerge data erasure in resources corresponding to first data, and the erasure position is a position of the resources that emerge data erasure in the resources corresponding to the first data; and determining, by the first node, second data according to the feedback information, and sending the second data to the second node, where the second data is configured for performing decoding together with the first data sent from the first node.

Optionally, the resources corresponding to the first data and resources corresponding to the second data include one of: a time-frequency domain resource, a transport layer, an antenna port, and a carrier, where the time-frequency domain resource is defined by time-domain resources h, and N1 and N2 are positive integers.

Optionally, a length of the time-domain resources includes: a length of one of an orthogonal frequency division multiplexing (OFDM) symbol, a time slot, a subframe and a radio frame occupied in the time-domain resource; and the length of frequency-domain resources includes a length of one of a subcarrier, a resource block (RB), and a subband occupied in the frequency-domain resource.

Optionally, the time-frequency domain resource includes one of: a resource unit (RU), a resource block (RB), and a subband.

Optionally, the resources corresponding to the first data are divided into Mj mutually exclusive resource index sets according to the jth resource granularity, one of the Mj mutually exclusive resource index sets is an erasure position, Mj erasure positions form an erasure position set j, j is a positive integer and j≤J, J is the number of erasure position sets corresponding to preset J types of resource granularity, and J is a positive integer.

Optionally, in condition that the number of resource indices in the erasure position is greater than 1, the resource indices are continuous.

Optionally, the second data is one of N redundancy versions of data, where the redundancy versions are determined according to one of: a preset erasure rate, and a combination of the preset erasure rate and a preset erasure position, and N is a positive integer.

Another embodiment of the present disclosure provides a data processing device. The device includes: a first determining module, which is configured to determine that first data sent from a first node emerges data erasure; a feedback module, which is configured to send feedback information to the first node, where the feedback information includes one of: an erasure rate, and the erasure rate and an erasure position, the erasure rate is a proportion of resources that emerge data erasure in resources corresponding to the first data, and the erasure position is a position of the resources that emerge data erasure in the resources corresponding to the first data; a first receiving module, which is configured to receive second data determined according to the feedback information by the first node; and a decoding module, which is configured to perform decoding according to the first data and the second data.

Optionally, the first determining module includes: a first determining unit, which is configured to determine that the resources corresponding to the first data sent from the first node emerge the data erasure in a case where an equivalent received signal to interference plus noise ratio (SINR) of a signal on the resources corresponding to the first data is checked to be less than a first predetermined threshold T1; a second determining unit, which is configured to determine that the resources corresponding to the first data sent from the first node emerge the data erasure in a case where a sum of interference and noise power on the resources corresponding to the first data is checked to be greater than a second predetermined threshold T2; and a third determining unit, which is configured to determine that the resources corresponding to the first data sent from the first node emerge the data erasure in a case where a signal power on the resources corresponding to the first data is checked to be lower than a third predetermined threshold T3. T1, T2, and T3 are real numbers.

Optionally, the resources corresponding to the first data and resources corresponding to the second data include one of: a time-frequency domain resource, a transport layer, an antenna port, and a carrier, where the time-frequency domain resource is defined by a time-domain resource having a length of N1 and a frequency-domain resource having a length of N2, and N1 and N2 are positive integers.

Optionally, a length of the time-domain resources includes: a length of one of an orthogonal frequency division multiplexing (OFDM) symbol, a time slot, a subframe and a radio frame occupied in the time-domain resource; and the length of the frequency-domain resources includes a length of one of a subcarrier, a resource block (RB) and a subband occupied in the frequency-domain resource.

Optionally, the time-frequency domain resource includes one of: a resource unit (RU), a resource block (RB), and a subband.

Optionally, the resources corresponding to the first data are divided into Mj mutually exclusive resource index sets according to the jth resource granularity, one of the Mj mutually exclusive resource index sets is an erasure position, Mj erasure positions form an erasure position set j, j is a positive integer and j≤J, J is the number of erasure position sets corresponding to preset J types of resource granularity, and J is a positive integer.

Optionally, in condition that the number of resource indices in the erasure position is greater than 1, the resource indices are continuous.

Optionally, the second data is one of N redundancy versions of data, where the redundancy versions are determined according to one of: a preset erasure rate, and a combination of the preset erasure rate and a preset erasure position, and N is a positive integer.

Another embodiment of the present disclosure provides a node, including the device of any one of the embodiments described above.

Another embodiment of the present disclosure provides a second receiving module and a second determining module. The second receiving module is configured to receive feedback information sent from a second node. The feedback information includes one of: an erasure rate, and the erasure rate and an erasure position. The erasure rate is a proportion of resources that emerge data erasure in resources corresponding to first data, and the erasure position is a position of the resources that emerge data erasure in the resources corresponding to the first data. The second determining module is configured to determine second data according to the feedback information, and send the second data to the second node, where the second data is used for performing decoding together with the first data sent from the first node.

Optionally, the resources corresponding to the first data and resources corresponding to the second data include one of: a time-frequency domain resource, a transport layer, an antenna port, and a carrier, where the time-frequency domain resource is defined by a time-domain resource having a length of N1 and a frequency-domain resource having a length of N2, and N1 and N2 are positive integers.

Optionally, the lengths of time-domain resources include time-domain lengths occupied by one of time-domain resources including: a length of the time-domain resources includes: a length of one of an orthogonal frequency division multiplexing (OFDM) symbol, a time slot, a subframe and a radio frame occupied in the time-domain resource; and the length of frequency-domain resources includes a length of one of a subcarrier, a resource block (RB), and a subband occupied in the frequency-domain resource.

Optionally, the time-frequency domain resource includes one of: a resource unit (RU), a resource block (RB), and a subband.

Optionally, the resources corresponding to the first data are divided into Mj mutually exclusive resource index sets according to the jth resource granularity, one of the Mj mutually exclusive resource index sets is an erasure position, Mj erasure positions form an erasure position set j, j is a positive integer and j≤J, J is the number of erasure position sets corresponding to preset J types of resource granularity, and J is a positive integer.

Optionally, when the number of resource indices in the erasure position is greater than 1, the resource indices are continuous.

Optionally, the second data is one of N redundancy versions of data, where the redundancy versions are determined according to one of: a preset erasure rate, and a combination of the preset erasure rate and a preset erasure position, and N is a positive integer.

Another embodiment of the present disclosure provides a node, including the device of any one of the embodiments described above.

Another embodiment of the present disclosure further provides a storage medium. The storage medium is configured to store program codes for performing the steps described below. A second node determines that first data sent from a first node emerges data erasure; the second node sends feedback information to the first node, where the feedback information includes one of: an erasure rate, and the erasure rate and an erasure position, the erasure rate is a proportion of resources that emerge data erasure in resources corresponding to the first data, and the erasure position is a position of the resources that emerge data erasure in the resources corresponding to the first data; the second node receives second data determined according to the feedback information by the first node; and the second node performs decoding according to the first data and the second data.

Optionally, the storage medium is further configured to store program codes for performing the steps described below. The second node determines that the first data sent from the first node emerges the data erasure when at least one of following is checked by the second node: an equivalent received signal to interference plus noise ratio (SINR) of a signal on the resources corresponding to the first data being less than a first predetermined threshold T1; a sum of interference and noise power on the resources corresponding to the first data being greater than a second predetermined threshold T2; and a signal power on the resources corresponding to the first data being lower than a third predetermined threshold T3. T1, T2, and T3 are real numbers.

Optionally, the storage medium is further configured to store program codes for performing the steps described below. The resources corresponding to the first data and resources corresponding to the second data include one of: a time-frequency domain resource, a transport layer, an antenna port, and a carrier, where the time-frequency domain resource is defined by a time-domain resource having a length of N1 and a frequency-domain resource having a length of N2, and N1 and N2 are positive integers.

Optionally, the storage medium is further configured to store program codes for performing the steps described below. A length of the time-domain resources includes: a length of one of an orthogonal frequency division multiplexing (OFDM) symbol, a time slot, a subframe and a radio frame occupied in the time-domain resource; and the length of frequency-domain resources includes a length of one of a subcarrier, a resource block (RB), and a subband occupied in the frequency-domain resource.

Optionally, the storage medium is further configured to store program codes for performing the steps described below. The time-frequency domain resource includes one of: a resource unit (RU), a resource block (RB), and a subband.

Optionally, the storage medium is further configured to store program codes for performing the steps described below. The resources corresponding to the first data are divided into Mj mutually exclusive resource index sets according to the jth resource granularity, one of the Mj mutually exclusive resource index sets is an erasure position, Mj erasure positions form an erasure position set j, j is a positive integer and j≤J, J is the number of erasure position sets corresponding to preset J types of resource granularity, and J is a positive integer.

Optionally, the storage medium is further configured to store program codes for performing the steps described below. When the number of resource indices in the erasure position is greater than 1, the resource indices are continuous.

Optionally, the storage medium is further configured to store program codes for performing the steps described below. The second data is one of N redundancy versions of data, where the redundancy versions are determined according to one of: a preset erasure rate, and a combination of the preset erasure rate and a preset erasure position, and N is a positive integer. Another embodiment of the present disclosure further provides a storage medium. The storage medium is configured to store program codes for performing the steps described below. A first node receives feedback information sent from a second node, where the feedback information includes one of: an erasure rate, and the erasure rate and an erasure position, the erasure rate is a proportion of resources that emerge data erasure in resources corresponding to first data, and the erasure position is a position of the resources that emerge data erasure in the resources corresponding to the first data; and the first node determines second data according to the feedback information, and sends the second data to the second node, where the second data is used for performing decoding together with the first data sent from the first node.

Optionally, the storage medium is further configured to store program codes for performing the steps described below. The resources corresponding to the first data and resources corresponding to the second data include one of: a time-frequency domain resource, a transport layer, an antenna port, and a carrier, where the time-frequency domain resource is defined by a time-domain resource having a length of N1 and a frequency-domain resource having a length of N2, and N1 and N2 are positive integers.

Optionally, the storage medium is further configured to store program codes for performing the steps described below. A length of the time-domain resources includes: a length of one of an orthogonal frequency division multiplexing (OFDM) symbol, a time slot, a subframe and a radio frame occupied in the time-domain resource; and the length of frequency-domain resources includes a length of one of a subcarrier, a resource block (RB), and a subband occupied in the frequency-domain resource.

Optionally, the storage medium is further configured to store program codes for performing the steps described below. The time-frequency domain resource includes one of: a resource unit (RU), a resource block (RB), and a subband.

Optionally, the storage medium is further configured to store program codes for performing the steps described below. The resources corresponding to the first data are divided into Mj mutually exclusive resource index sets according to the jth resource granularity, one of the Mj mutually exclusive resource index sets is an erasure position, Mj erasure positions form an erasure position set j, j is a positive integer and j≤J, J is the number of erasure position sets corresponding to preset J types of resource granularity, and J is a positive integer.

Optionally, the storage medium is further configured to store program codes for performing the steps described below. In condition that the number of resource indices in the erasure position is greater than 1, the resource indices are continuous.

Optionally, the storage medium is further configured to store program codes for performing the steps described below. The second data is one of N redundancy versions of data, where the redundancy versions are determined according to one of: a preset erasure rate, and a combination of the preset erasure rate and a preset erasure position, and N is a positive integer. Through the embodiments of the present disclosure, a second node determines that first data sent from a first node emerges data erasure. The second node sends feedback information to the first node. The feedback information includes one of: an erasure rate, and the erasure rate and an erasure position. The erasure rate is a proportion of resources that emerge data erasure in the first data, and the erasure position is a position of the resources that emerge data erasure in the first data. The second node receives second data determined according to the feedback information by the first node, and the second data includes the resources that emerge the data erasure in the first data. The second node performs decoding according to the first data and the second data. Since when the first data emerges data erasure, retransmission is performed on second data determined according to the erasure rate or according to the erasure rate and the erasure position is retransmitted, not on the entire first data, which solves the problem, in the existing art, that when a decoding error occurs in a transport block, the entire transport block is retransmitted, which causes a waste of radio resources, and increases decoding complexity as well as transmission delay.

BRIEF DESCRIPTION OF DRAWINGS

The drawings described herein are used to provide a further understanding of the present disclosure and form a part of the present application. The exemplary embodiments and descriptions thereof in the present disclosure are used to explain the present disclosure and not to limit the present disclosure in any improper way. In the drawings:

FIG. 4 is a flowchart 2 of a decoding processing method according to an embodiment of the present disclosure;

DETAILED DESCRIPTION

Hereinafter the present disclosure will be described in detail with reference to the drawings in conjunction with the embodiments. It should be noted that if not in collision, the embodiments and features therein in the present application may be combined with each other.

It should be noted that the terms "first", "second" and the like in the description, claims and drawings of the present disclosure are used to distinguish between similar objects and are not necessarily used to describe a particular order or sequence.

Embodiment 1

Figure 1:
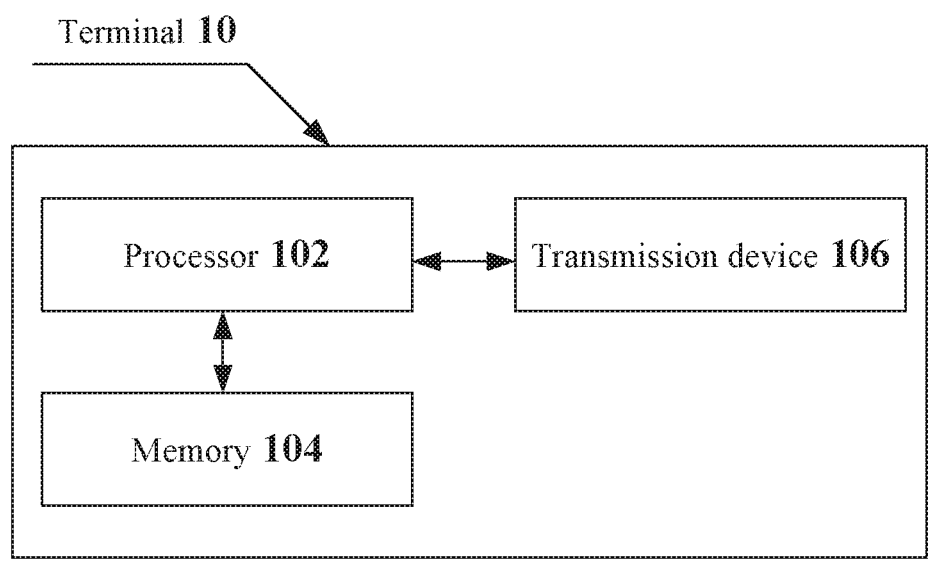
FIG. 1 is a structural block diagram of hardware of a terminal executing a decoding processing method according to an embodiment of the present disclosure.

The method embodiment provided by the embodiment 1 of the present application may be executed on a terminal, a computer terminal or other similar computing devices. In an example in which the method is executed in the terminal, FIG. 1 is a structural block diagram of hardware of a terminal executing a decoding processing method according to the embodiment of the present disclosure. As shown in FIG. 1, a terminal 10 may include one or more (merely one is shown in FIG. 1) processors 102 (the processor 102 may include, but is not limited to, a microprocessor such as a microcontroller unit (MCU) or a programmable logic device such as a field programmable gate array (FPGA)), a memory 104 configured to store data, and a transmission device 106 configured to implement a communication function. It should be understood by those of ordinary skill in the art that the structure shown in FIG. 1 is merely illustrative and not intended to limit the structure of the electronic device described above. For example, the terminal 10 may further include more or less components than the components shown in FIG. 1, or has a configuration different from the configuration shown in FIG. 1.

The memory 104 may be configured to store software programs and modules of application software, such as program instructions/modules corresponding to the decoding processing method in the embodiments of the present disclosure. The processor 102 executes the software programs and modules stored in the memory 104 to perform various function applications and data processing, that is, to implement the method described above. The memory 104 may include a high-speed random access memory, and may further include a nonvolatile memory, such as one or more magnetic storage devices, flash memories or other nonvolatile solid-state memories. In some examples, the memory 104 may further include memories that are remotely disposed with respect to the processors 102. These remote memories may be connected to the terminal 10 via a network. Examples of the network described above include, but are not limited to, the Internet, an intranet, a local area network, a mobile communication network and a combination thereof.

The transmission device 106 is configured to receive or send data via a network. Specific examples of such a network may include a wireless network provided by a communication provider of the terminal 10. In one example, the transmission device 106 includes a network interface controller (NIC), which may be connected to other network devices via a base station and thus be capable of communicating with the Internet. In one example, the transmission 106 may be a radio frequency (RF) module, which is configured to communicate with the Internet in a wireless way.

Figure 2:
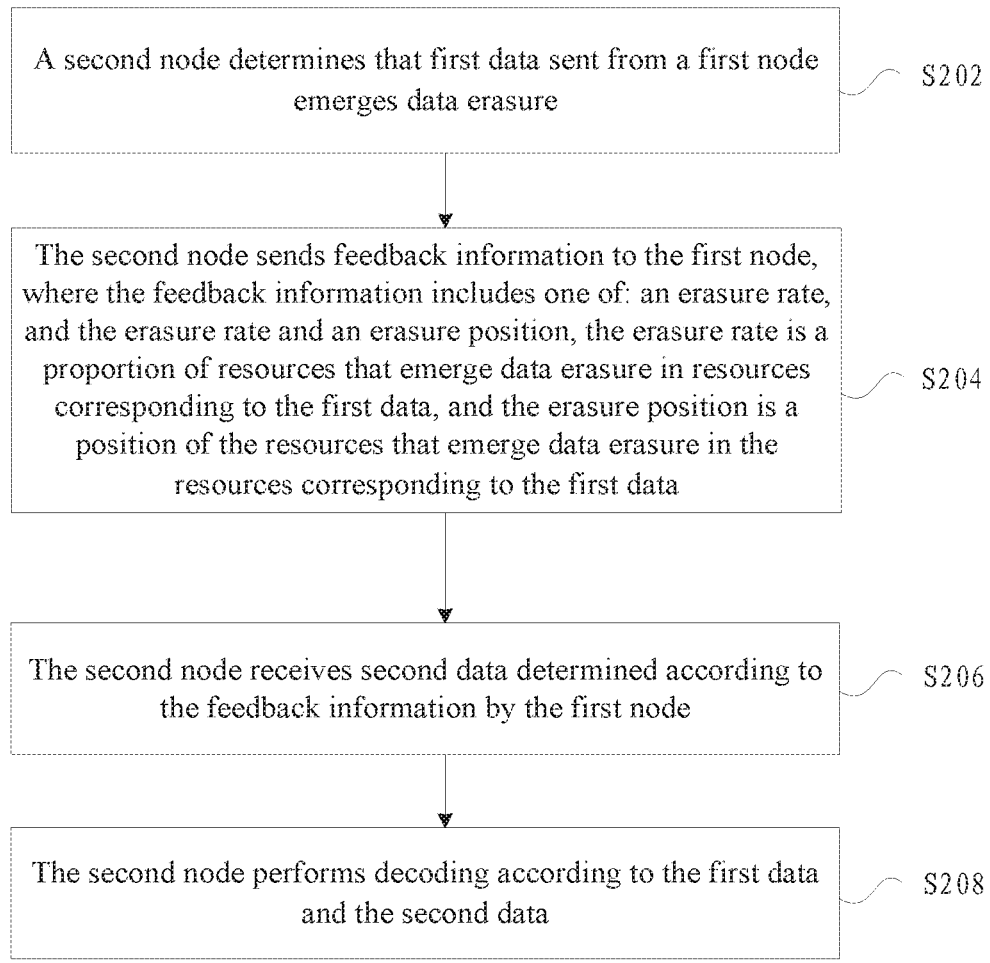
FIG. 2 is a flowchart 1 of a decoding processing method according to an embodiment of the present disclosure.

The embodiment provides a decoding processing method executed on the terminal described above. FIG. 2 is a flowchart 1 of the decoding processing method according to the embodiment of the present disclosure. As shown in FIG. 2, the process includes the steps described below.

In S202, a second node determines that first data sent from a first node emerges data erasure.

In S204, the second node sends feedback information to the first node. The feedback information includes one of: an erasure rate, and the erasure rate and an erasure position. The erasure rate is a proportion of resources that emerge data erasure in the first data, and the erasure position is a position of the resources that emerge data erasure in the first data.

In S206, the second node receives second data determined according to the feedback information by the first node. The second data includes the resources that emerge the data erasure in the first data.

In S208, the second node performs decoding according to the first data and the second data.

With the steps described above, when the first data emerges data erasure, retransmission is performed on second data determined according to the erasure rate or according to the erasure rate and the erasure position is retransmitted, not on the entire first data, which solves the problem, in the related art, that when a decoding error occurs in a transport block, the entire transport block is retransmitted, which causes a waste of radio resources, and increases decoding complexity as well as transmission delay.

For example, the feedback information may include at least one of: erasure rate indication information, and the erasure rate indication information and erasure position indication information. The erasure rate indication information is represented by M1 bits, and at least one value of the M1 bits is used to indicate the erasure rate. The erasure position indication information is represented by M2 bits, and at least one value of the M2 bits is used to indicate the erasure position. M1 and M2 are positive integers. For another example, the erasure rate may further be obtained according to the erasure location indication information. Optionally, the second node determines that the first data sent from the first node emerges the data erasure when at least one of following is checked by the second node: an equivalent received signal to interference plus noise ratio (SINR) of a signal on the first data being less than a first predetermined threshold T1; a sum of interference and noise power on the first data being greater than a second predetermined threshold T2; and a signal power on the first data being lower than a third predetermined threshold T3. T1, T2, and T3 are real numbers.

Optionally, the resources corresponding to the first data and resources corresponding to the second data include one of: a time-frequency domain resource, a transport layer, an antenna port, and a carrier. The time-frequency domain resource is defined by a time-domain resource having a length of N1 and a frequency-domain resource having a length of N2, and N1 and N2 are positive integers. Optionally, a length of time-domain resources includes: a length of the time-domain resources includes: a length of one of an orthogonal frequency division multiplexing (OFDM) symbol, a time slot, a subframe and a radio frame occupied in the time-domain resource; the length of the frequency-domain resources includes a length of one of a subcarrier, a resource block (RB) and a subband occupied in the frequency-domain resource, and the time-frequency domain resource includes one of: a resource unit (RU), a resource block (RB), and a subband.

Optionally, the resources corresponding to the first data are divided into Mj mutually exclusive resource index sets according to the jth resource granularity, one of the Mj mutually exclusive resource index sets is an erasure position, Mj erasure positions form an erasure position set j, j is a positive integer and j≤J, J is the number of erasure position sets corresponding to preset J types of resource granularity, and J is a positive integer. Optionally, the larger the resource granularity, the greater the number of resource indices of the erasure position in the corresponding erasure position set, and the smaller the number of erasure positions in the erasure position set. Optionally, when the number of resource indices in the erasure position is greater than 1, the resource indices are continuous.

For example, it is assumed that the first node sends data to the second node through the resource blocks (RB) numbered 0 to 199. The erasure position definition is described as follows. 200 RBs are divided into 6 erasure position sets according to J=6 types of resource granularity. A first erasure position set includes 1 erasure position which includes all RBs indexed from 0 to 199. A second erasure position set includes 2 erasure positions, a resource index set of RBs corresponding to a first (the first here is with respect to the second erasure position set, and this first in the second erasure position set is a second in all erasure positions) erasure position is {0, 1, . . . , 99}, and a resource index set of RBs corresponding to a second erasure position is {100, 101, . . . , 199}. A third erasure position set includes 4 erasure positions, a resource index set of RBs corresponding to a first erasure position is {0, 1, . . . , 49}, a resource index set of RBs corresponding to a second erasure position is {50, 51, . . . , 99}; a resource index set of RBs corresponding to a third erasure position is {100, 101, . . . 149}, a resource index set of RBs corresponding to a fourth erasure position is {150, 151, . . . , 199}, and so on, and a sixth erasure position set includes 32 erasure positions. The number of RB indices of each of the 32 erasure positions is 6 or 7. Specifically, 8 erasure positions each include 7 RBs, and 24 resource positions each include 6 RBs. In summary, the larger the resource granularity, the smaller the number of erasure positions in the erasure position set, and correspondingly, the greater the number of resource indices of RBs in one erasure position.

Figure 3:
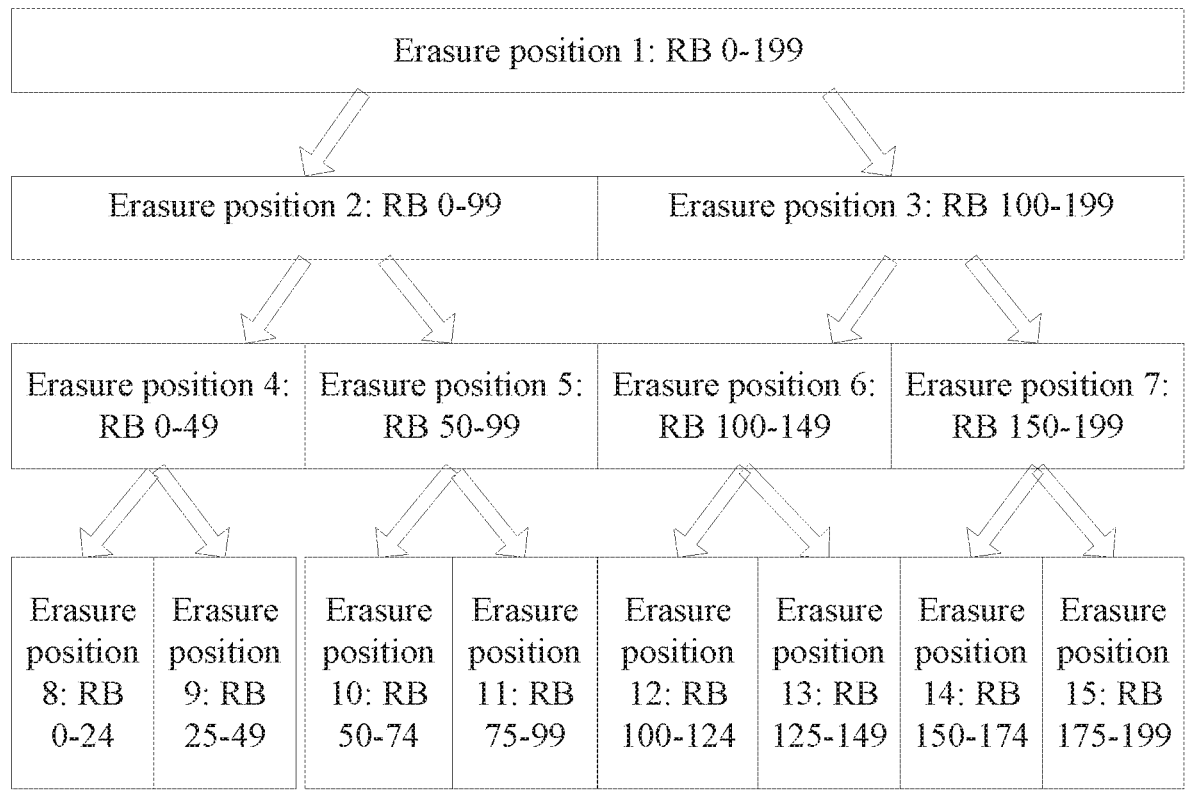
FIG. 3 is a schematic diagram of an erasure position definition according to an embodiment of the present disclosure.

FIG. 3 is a schematic diagram of an erasure position definition according to the embodiment of the present disclosure. As shown in FIG. 3, merely a total of 15 erasure positions in four erasure position sets under four resource granularities are illustrated in the embodiment of the present disclosure. The above definition produces a total of 1+2+4+8+16+32=63 erasure positions, which may be indicated by 6 bits.

When the second node feeds back the erasure position information, relevant resources causing the decoding error should be included in the corresponding erasure position, and the erasure position where the number of RB resource indices is the smallest should be selected. This erasure position definition corresponds to various possible erasure positions under reasonable feedback overhead, thereby effectively implementing HARQ retransmission.

Of course, in other implementation modes, RBs included in each resource position may also not be continuous.

It should be noted that the method described above may be applied to the HARQ. In order to facilitate the understanding of the embodiment described above, the embodiment of the present disclosure takes the eMBB scenario as an example, uses resources corresponding to the first data and resources corresponding to the second data as the resource blocks (RB), and uses the erasure rate as the feedback information for description. The first node performs sending side processing such as coding and modulation on the transport block. The data is mapped onto the resource blocks (RB) numbered 0 to 199 and is sent to the second node. A transmit signal is received by the receiving side through the fading channel. On a bandwidth of 200 RBs, the enhancement and attenuation effects of the channel on the signal are different, so that the equivalent received signal to interference plus noise ratios (SINR) of the receive signal on the 200 RBs are different.

The second node performs receiving side processing such as demodulation and decoding on the transport block as the receiving side. 11 RBs numbered 9 to 19 are severely affected by burst interference, so the equivalent received signal to interference plus noise ratios (SINR) is lower than a specified threshold, so that the corresponding code blocks cannot be correctly decoded.

The receiving side feeds back the erasure rate through the channel. In the present embodiment, the erasure rate P is used for indicating a proportion of RBs that cause receiving of incorrect data in the 200 RBs, that is, P=11/200=0.055, and P is quantized to 0.1.

After the sending side obtains the transmission erasure rate sent from the receiving side, the sending side resends a certain proportion of encoded data to the receiving side. In the embodiment, the proportion is R and R=P/(1−P)=1/9, that is, data on about 23 RBs is resent. For example, in the embodiment, data of the R*200 RBs is obtained by coding data of 200 RBs previously sent. The coding form may be diverse, including that an exclusive-or operation is performed on the first transmitted data with a specified resource granularity, to obtain retransmitted packet coding data. For another example, in the embodiment, the R*200 RB data is a fountain code data or other rateless coding data of a transport block. For the fountain code or other rateless coding, if a transport block is coded, in theory, an infinite length of coding redundancy data may be obtained. In the case where the transport block cannot be correctly decoded in the first transmission, part of the coding redundancy data different from data in the first transmission continues to be sent in the second transmission. If the transport block still cannot be correctly decoded after data in the first transmission and data in the second transmission are combined, another part of the encoding redundancy data different from the data in the first transmission and the data in the second transmission is transmitted in the third transmission until the transport block is correctly decoded.

After the receiving side receives the retransmitted data, the receiving side performs decoding according to the data received twice, and obtains a correctly decoded transport block. In the embodiment, when the receiving side cannot correctly decode the transport block, the sending side does not resend the original entire transport block, but sends a certain proportion of data according to the erasure rate fed back by the receiving side, and the data is obtained by coding all the original RBs, or is part of the coding data of the transport block. According to these retransmitted data, the receiving side can perform decoding correctly. Therefore, wireless time-frequency resources required for retransmission are saved, the transmission delay and the decoding delay are saved, and the decoding complexity is reduced. The spectral efficiency and throughput of the system are improved.

In order to facilitate the understanding of the embodiment described above, the embodiment of the present disclosure takes the eMBB scenario as an example, uses resources corresponding to the first data and resources corresponding to the second data as the subbands, and uses the erasure rate as the feedback information for further description. The main difference between this embodiment and the previous embodiment is the definitions of the erasure rate and the retransmission data. In this embodiment of the present disclosure, the erasure rate is not defined according to the RB, but is defined according to the subband. In this embodiment, a length of a time-domain resource of one subband is N1=1 OFDM symbol, and a length of a frequency-domain resource is N2=6 RBs. The index of the subband is obtained according to the criterion of the frequency domain before the time domain.

In this embodiment, the data is mapped onto the subbands numbered 0 to 16 and is sent to the second node. In this embodiment, on the 7 subbands with indices 2 to 4, 7 to 8, and 15 to 16, the equivalent SINR is lower than a specified threshold due to severe fading, which causes corresponding code blocks cannot be correctly decoded. In this embodiment, the erasure rate P is used for indicating a proportion of subbands that cause receiving of incorrect data on the 17 subbands, that is, P=7/17=0.41, and P is quantized to 0.5.

After the sending side obtains the transmission erasure rate sent from the receiving side, the sending side resends a certain proportion of encoded data to the receiving side. In this embodiment, the proportion is R and R=P/(1−P)=1, that is, data on 17 subbands is resent. Data of the R*200 subbands is obtained by coding data of 17 subbands previously sent.

The time-frequency domain resource corresponding to the data sent from the first node to the second node varies with the scenario. For example, in a low delay scenario, data is mapped onto one or more OFDM symbols for transmission. In scenarios where the amount of data is very large, data may be mapped to multiple subframes, multiple time slots, and a different number of subcarriers. Different definitions of the erasure rate and the retransmission data may be applied to different application scenarios to implement HARQ retransmission. Wireless time-frequency resources required for retransmission are saved, the transmission delay and the decoding delay are saved, and the decoding complexity is reduced.

In addition, the erasure rate may also be defined according to the code block and the transport block, that is, defined as a proportion of code blocks or transport blocks that emerge error decoding in multiple code blocks or multiple transport blocks. The first node codes the multiple code blocks or transport blocks to obtain the corresponding numbers of retransmission code blocks or transport blocks. In addition, the erasure rate may also be defined according to an antenna port, a carrier, and a transport layer, that is, defined as a proportion of antenna ports, carriers, and transport layers that emerge error decoding in multiple antenna ports, multiple carriers, and multiple transport layers, respectively. Then the first node codes the multiple antenna ports, carriers, and transport layers to obtain the corresponding numbers of retransmission code blocks or transport blocks.

In order to facilitate the understanding of the embodiment described above, the embodiment of the present disclosure takes the eMBB scenario as an example, uses resources corresponding to the first data and resources corresponding to the second data as the resource blocks (RB), and uses the erasure rate and the erasure position as the feedback information for further description. When the erasure position is carried by erasure position indication information, the erasure position indication information indicates the position of 11 RBs in 200 RBs. According to the definition illustrated in FIG. 3, RBs indexed 9 to 19 are located at the erasure position 8, and of course also at the erasure position 4, while the erasure position including the smallest number of RBs needs to be selected. Therefore, the erasure position indication information indicates the erasure position 8. The erasure rate is P=11/200=0.055, and P is quantized to 0.1. After the sending side obtains the transmission erasure rate sent from the receiving side, the sending side resends a certain proportion of encoded data to the receiving side. In this embodiment, the proportion is R and R=P/(1−P)=1/9, that is, data on about 23 RBs is resent. Data of the R*200 RB is obtained by coding data at the erasure position 8 instead of by coding data of 200 RBs.

In this embodiment, the erasure position information is fed back, and then the coding complexity of the retransmission data is favorably reduced, and the decoding complexity for the receiving side is also favorably reduced. In addition, the erasure position is sent, and then the sending side may also directly resend the RBs corresponding to the erasure position, that is, the data of 25 RBs.

Optionally, the second data is one of N redundancy versions of data, where the redundancy versions are determined according to one of: a preset erasure rate, and a combination of the preset erasure rate and a preset erasure position, and N is a positive integer.

For example, taking the defined erasure position shown in FIG. 3 as an example, different erasure positions correspond to different RB indices. The first node codes the RB data corresponding to each of the erasure locations, and determines the corresponding number of retransmitted RBs according to the erasure rate, and thus the transmission redundancy version may be obtained. 63 erasure positions are provided in an embodiment 3, and in consideration of the number of erasure rates Nr, a total of 63*Nr redundancy versions may be obtained. At the time of retransmission, the first node transmits the redundancy version corresponding to the erasure rate and the erasure position fed back by the second node. Of course, the RB data at one erasure position may also be directly defined as a redundancy version, and a total of 63 redundancy versions are obtained. The redundancy version corresponding to the erasure position is transmitted during retransmission.

The embodiment provides a decoding processing method executed on the terminal described above. FIG. 4 is a flowchart 2 of the decoding processing method according to the embodiment of the present disclosure. As shown in FIG. 4, the process includes the steps described below.

In S402, a first node receives feedback information sent from a second node. The feedback information includes one of: an erasure rate, and the erasure rate and an erasure position. The erasure rate is a proportion of resources that emerge data erasure in resources corresponding to first data, and the erasure position is a position of the resources that emerge data erasure in the resources corresponding to the first data.

In S404, the first node determines second data according to the feedback information, and sends the second data to the second node. The second data is configured for performing decoding together with the first data sent from the first node.

Optionally, the resources corresponding to the first data and resources corresponding to the second data include one of: a time-frequency domain resource, a transport layer, an antenna port, and a carrier, where the time-frequency domain resource is defined by a time-domain resource having a length of N1 and a frequency-domain resource having a length of N2, and N1 and N2 are positive integers.

Optionally, a length of the time-domain resources includes a length of one of an orthogonal frequency division multiplexing (OFDM) symbol, a time slot, a subframe and a radio frame occupied in the time-domain resource; and the length of frequency-domain resources includes a length of one of a subcarrier, a resource block (RB), and a subband occupied in the frequency-domain resource.

Optionally, the time-frequency domain resource includes one of: a resource unit (RU), a resource block (RB), and a subband.

Optionally, the resources corresponding to the first data are divided into Mj mutually exclusive resource index sets according to the jth resource granularity, one of the Mj mutually exclusive resource index sets is an erasure position, Mj erasure positions form an erasure position set j, j is a positive integer and j≤J, J is the number of erasure position sets corresponding to preset J types of resource granularity, and J is a positive integer. Optionally, the larger the resource granularity, the greater the number of resource indices of the erasure position in the corresponding erasure position set, and the smaller the number of erasure positions in the erasure position set. Optionally, in condition that the number of resource indices in the erasure position is greater than 1, the resource indices are continuous.

Optionally, the second data is one of N redundancy versions of data, where the redundancy versions are determined according to one of: a preset erasure rate, and a combination of the preset erasure rate and a preset erasure position, and N is a positive integer.

In the embodiment described above, the correct transmission of super-large transport blocks is achieved at the expense of limited signaling. The wireless time-frequency resource is saved. The transmission delay, the decoding delay and the decoding complexity are reduced. It is beneficial for improving the spectral efficiency and improving the system throughput to meet the needs of the new generation wireless communication.

From the description of the embodiment described above, it will be apparent to those skilled in the art that the method in the embodiment described above may be implemented by software plus a necessary general-purpose hardware platform, or may of course be implemented by hardware. However, in many cases, the former is a preferred implementation mode. Based on this understanding, the solutions provided by the present disclosure substantially, or the part contributing to the existing art, may be embodied in the form of a software product. The computer software product is stored in a storage medium (such as a read-only memory (ROM)/random access memory (RAM), a magnetic disk or an optical disk) and includes several instructions for enabling a terminal device (which may be a mobile phone, a computer, a server, a network device, or the like) to execute the method according to each embodiment of the present disclosure.

Embodiment 2

The embodiment of the present disclosure further provides a decoding processing device and node. The device is configured for implementing the above-mentioned embodiments and preferred embodiments. What has been described will not be repeated. As used below, the term "module" may be software, hardware or a combination thereof capable of implementing predetermined functions. The device in the embodiments described below is preferably implemented by software, but implementation by hardware or by a combination of software and hardware is also possible and conceived.

Figure 5:
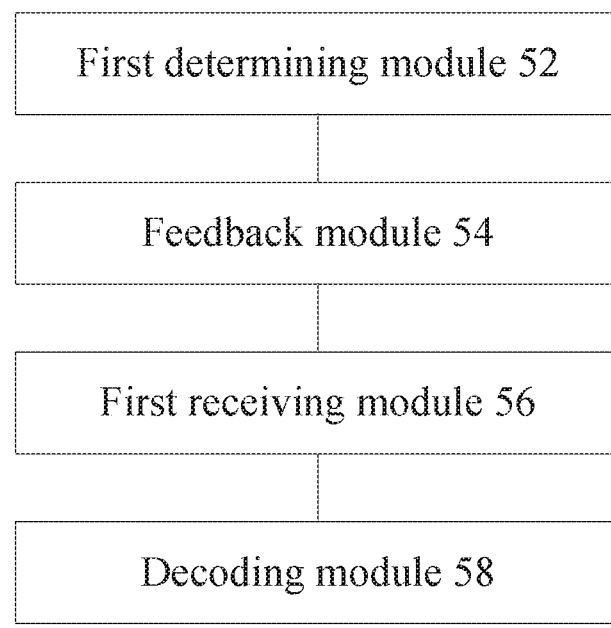
FIG. 5 is a structural block diagram 1 of a decoding processing device according to an embodiment of the present disclosure.

FIG. 5 is a structural block diagram 1 of a decoding processing device according to the embodiment of the present disclosure. As shown in FIG. 5, the device includes: a first determining module 52, a feedback module 54, a first receiving module 56, and a decoding module 58.

The first determining module 52 is configured to determine that first data sent from a first node emerges data erasure.

The feedback module 54 is connected to the determining module 52, and is configured to send feedback information to the first node. The feedback information includes one of: an erasure rate, and the erasure rate and an erasure position. The erasure rate is a proportion of resources that emerge data erasure in the first data, and the erasure position is a position of the resources that emerge data erasure in the first data.

The first receiving module 56 is connected to the feedback module 54, and is configured to receive second data determined according to the feedback information by the first node. The second data includes the resources that emerge the data erasure in the first data.

The decoding module 58 is connected to the receiving module 56, and is configured to perform decoding according to the first data and the second data.

Figure 6:
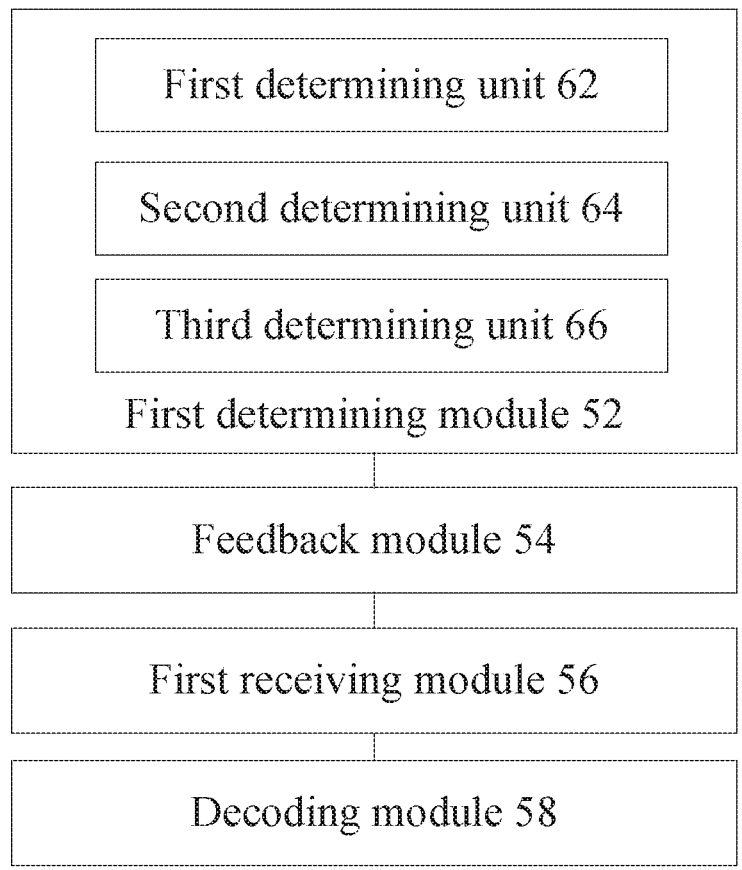
FIG. 6 is a structural block diagram of a determining module 52 in the decoding processing device according to an embodiment of the present disclosure.

FIG. 6 is a structural block diagram of the first determining module 52 in the decoding processing device according to the embodiment of the present disclosure. As shown in FIG. 6, the first determining module 52 includes: a first determining unit 62, a second determining unit 64, and a third determining unit 66, which are described below respectively.

The first determining unit 62 is configured to determine that the first data sent from the first node emerges the data erasure in a case where an equivalent received signal to interference plus noise ratio (SINR) of a signal on the first data is checked to be less than a first predetermined threshold T1.

The second determining unit 64 is configured to determine that the first data sent from the first node emerges the data erasure in a case where a sum of interference and noise power on the first data is checked to be greater than a second predetermined threshold T2.

The third determining unit 66 is configured to determine that the first data sent from the first node emerges the data erasure in a case where a signal power on the first data is detected to be lower than a third predetermined threshold T3.

T1, T2, and T3 are real numbers.

Optionally, the resources corresponding to the first data and resources corresponding to the second data include one of: a time-frequency domain resource, a transport layer, an antenna port, and a carrier, where the time-frequency domain resource is defined by a time-domain resource having a length of N1 and a frequency-domain resource having a length of N2, and N1 and N2 are positive integers.

Optionally, a length of the time-domain resources includes: a length of one of an orthogonal frequency division multiplexing (OFDM) symbol, a time slot, a subframe and a radio frame occupied in the time-domain resource; and the length of the frequency-domain resources includes a length of one of a subcarrier, a resource block (RB) and a subband occupied in the frequency-domain resource.

Optionally, the time-frequency domain resource includes one of: a resource unit (RU), a resource block (RB), and a subband.

Optionally, the resources corresponding to the first data are divided into Mj mutually exclusive resource index sets according to the jth resource granularity, one of the Mj mutually exclusive resource index sets is an erasure position, Mj erasure positions form an erasure position set j, j is a positive integer and j≤J, J is the number of erasure position sets corresponding to preset J types of resource granularity, and J is a positive integer.

Optionally, in condition that the number of resource indices in the erasure position is greater than 1, the resource indices are continuous.

Optionally, the second data is one of N redundancy versions of data, where the redundancy versions are determined according to one of: a preset erasure rate, and a combination of the preset erasure rate and a preset erasure position, and N is a positive integer.

Figure 7:
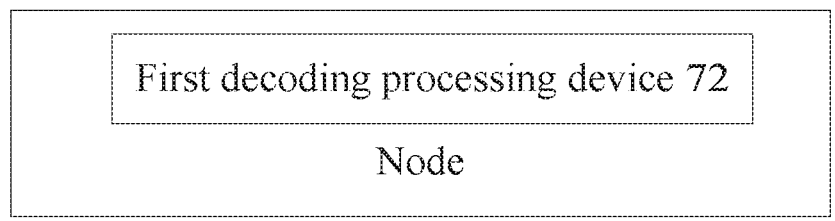
FIG. 7 is a structural block diagram 1 of a node according to an embodiment of the present disclosure.

The embodiment further provides a node. FIG. 7 is a structural block diagram 1 of the node according to the embodiment of the present disclosure. As shown in FIG. 7, the node includes a first decoding processing device 72. The decoding processing device includes the device of any one of the embodiments described above.

Figure 8:
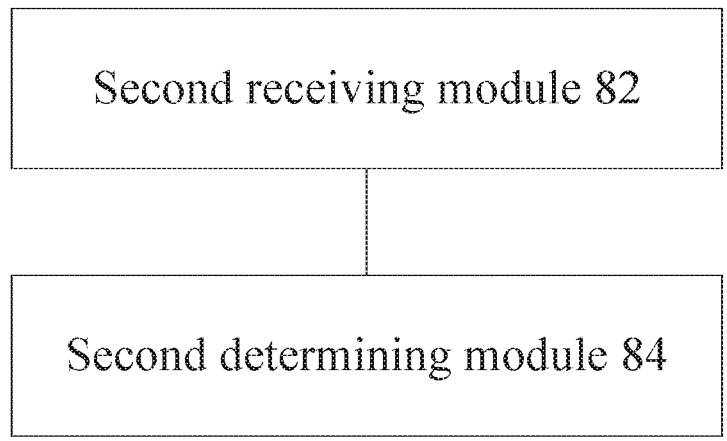
FIG. 8 is a structural block diagram 2 of a decoding processing device according to an embodiment of the present disclosure.

FIG. 8 is a structural block diagram 2 of a decoding processing device according to the embodiment of the present disclosure. As shown in FIG. 8, the device includes: a second receiving module 82 and a second determining module 84.

The second receiving module 82 is configured to receive feedback information sent from a second node. The feedback information includes one of: an erasure rate, and the erasure rate and an erasure position. The erasure rate is a proportion of resources that emerge data erasure in resources corresponding to first data, and the erasure position is a position of the resources that emerge data erasure in the resources corresponding to the first data.

The second determining module 84 is connected to the second receiving module 82, and is configured to determine second data according to the feedback information, and send the second data to the second node. The second data is used for performing decoding together with the first data sent from the first node.

Optionally, the resources corresponding to the first data and resources corresponding to the second data include one of: a time-frequency domain resource, a transport layer, an antenna port, and a carrier, where the time-frequency domain resource is defined by a time-domain resource having a length of N1 and a frequency-domain resource having a length of N2, and N1 and N2 are positive integers.

Optionally, a length of the time-domain resources includes: a length of one of an orthogonal frequency division multiplexing (OFDM) symbol, a time slot, a subframe and a radio frame occupied in the time-domain resource; and the length of frequency-domain resources includes a length of one of a subcarrier, a resource block (RB), and a subband occupied in the frequency-domain resource.

Optionally, the time-frequency domain resource includes one of: a resource unit (RU), a resource block (RB), and a subband.

Optionally, the resources corresponding to the first data are divided into Mj mutually exclusive resource index sets according to the jth resource granularity, one of the Mj mutually exclusive resource index sets is an erasure position, Mj erasure positions form an erasure position set j, j is a positive integer and j≤J, J is the number of erasure position sets corresponding to preset J types of resource granularity, and J is a positive integer.

Optionally, in condition that the number of resource indices in the erasure position is greater than 1, the resource indices are continuous.

Optionally, the second data is one of N redundancy versions of data, where the redundancy versions are determined according to one of: a preset erasure rate, and a combination of the preset erasure rate and a preset erasure position, and N is a positive integer.

Figure 9:
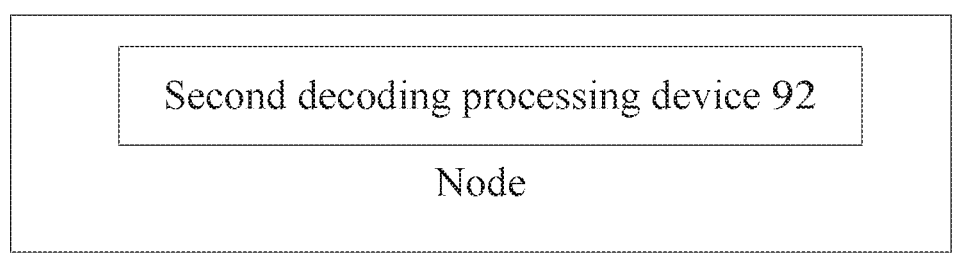
FIG. 9 is a structural block diagram 2 of a node according to an embodiment of the present disclosure.

The embodiment further provides a node. FIG. 9 is a structural block diagram 2 of a node according to the embodiment of the present disclosure. As shown in FIG. 9, the node includes a second decoding processing device 92. The decoding processing device includes the device of any one of the embodiments described above.

It should be noted that the various modules described above may be implemented by software or hardware. Implementation by hardware may, but may not necessarily, be performed in the following manner: the various modules described above are located in a same processor, or the various modules described above are located in their respective processors in any combination form.

Embodiment 3

The embodiment of the present disclosure further provides a storage medium. Optionally, in the embodiment, the storage medium described above may be configured to store program codes for executing the steps described below.

In S1, a second node determines that first data sent from a first node emerges data erasure.

In S2, the second node sends feedback information to the first node. The feedback information includes one of: an erasure rate, and the erasure rate and an erasure position. The erasure rate is a proportion of resources that emerge data erasure in resources corresponding to first data, and the erasure position is a position of the resources that emerge data erasure in the resources corresponding to the first data.

In S3, the second node receives second data determined according to the feedback information by the first node.

In S4, the second node performs decoding according to the first data and the second data.

Optionally, the storage medium is further configured to store program codes for performing the steps described below. The second node determines that the first data sent from the first node emerges the data erasure when a case of at least one of: S1, S2, and S3 is checked by the second node.

In S1, the second node checks that an equivalent received signal to interference plus noise ratio (SINR) of a signal on the resources corresponding to the first data is less than a first predetermined threshold T1.

In S2, the second node checks that a sum of interference and noise power on the resources corresponding to the first data is greater than a second predetermined threshold T2.

In S3, the second node checks that a signal power on the resources corresponding to the first data is lower than a third predetermined threshold T3.

T1, T2, and T3 are real numbers.

Optionally, the storage medium is further configured to store program codes for executing the step described below.

In S1, the resources corresponding to the first data and resources corresponding to the second data include one of: a time-frequency domain resource, a transport layer, an antenna port, and a carrier, where the time-frequency domain resource is defined by a time-domain resource having a length of N1 and a frequency-domain resource having a length of N2, and N1 and N2 are positive integers.

Optionally, the storage medium is further configured to store program codes for executing the steps described below.

In S1, a length of the time-domain resources includes: a length of one of an orthogonal frequency division multiplexing (OFDM) symbol, a time slot, a subframe and a radio frame occupied in the time-domain resource.

In S2, the length of the frequency-domain resources includes a length of one of a subcarrier, a resource block (RB) and a subband occupied in the frequency-domain resource.

Optionally, the storage medium is further configured to store program codes for executing the step described below.

In S1, the time-frequency domain resource includes one of: a resource unit (RU), a resource block (RB), and a subband.

Optionally, the storage medium is further configured to store program codes for executing the step described below.

In S1, the resources corresponding to the first data are divided into Mj mutually exclusive resource index sets according to the jth resource granularity. One of the Mj mutually exclusive resource index sets is an erasure position. Mj erasure positions form an erasure position set j. j is a positive integer, and j≤J. J is the number of erasure position sets corresponding to preset J types of resource granularity, and J is a positive integer.

Optionally, the storage medium is further configured to store program codes for executing the step described below.

In S1, in condition that the number of resource indices in the erasure position is greater than 1, the resource indices are continuous.

Optionally, the storage medium is further configured to store program codes for executing the step described below.

In S1, the second data is one of N redundancy versions of data, where the redundancy versions are determined according to one of: a preset erasure rate, and a combination of the preset erasure rate and a preset erasure position, and N is a positive integer.

The embodiment of the present disclosure further provides a storage medium. Optionally, in the embodiment, the storage medium described above may be configured to store program codes for executing the steps described below.

In S1, a first node receives feedback information sent from a second node. The feedback information includes one of: an erasure rate, and the erasure rate and an erasure position. The erasure rate is a proportion of resources that emerge data erasure in resources corresponding to first data, and the erasure position is a position of the resources that emerge data erasure in the resources corresponding to the first data.

In S2, the first node determines second data according to the feedback information, and sends the second data to the second node. The second data is used for performing decoding together with the first data sent from the first node.

Optionally, the storage medium is further configured to store program codes for executing the step described below.

In S1, the resources corresponding to the first data and resources corresponding to the second data include one of: a time-frequency domain resource, a transport layer, an antenna port, and a carrier. The time-frequency domain resource is defined by a time-domain resource having a length of N1 and a frequency-domain resource having a length of N2, and N1 and N2 are positive integers.

Optionally, the storage medium is further configured to store program codes for executing the steps described below.

In S1, a length of time-domain resources includes: a length of one of an orthogonal frequency division multiplexing (OFDM) symbol, a time slot, a subframe and a radio frame occupied in the time-domain resource.

In S2, the length of frequency-domain resources includes a length of one of a subcarrier, a resource block (RB), and a subband occupied in the frequency-domain resource.

Optionally, the storage medium is further configured to store program codes for executing the step described below.

In S1, the time-frequency domain resource includes one of: a resource unit (RU), a resource block (RB), and a subband.

Optionally, the storage medium is further configured to store program codes for executing the step described below.

In S1, the resources corresponding to the first data are divided into Mj mutually exclusive resource index sets according to the jth resource granularity. One of the Mj mutually exclusive resource index sets is an erasure position. Mj erasure positions form an erasure position set j. j is a positive integer, and j≤J. J is the number of erasure position sets corresponding to preset J types of resource granularity, and J is a positive integer.

Optionally, the storage medium is further configured to store program codes for executing the step described below.

In S1, in condition that the number of resource indices in the erasure position is greater than 1, the resource indices are continuous.

Optionally, the storage medium is further configured to store program codes for executing the step described below.

In S1, the second data is one of N redundancy versions of data, where the redundancy versions are determined according to one of: a preset erasure rate, and a combination of the preset erasure rate and a preset erasure position, and N is a positive integer.

Optionally, in the embodiment, the storage medium described above may include, but is not limited to, a USB flash drive, a read-only memory (ROM), a random access memory (RAM), a mobile hard disk, a magnetic disk, an optical disk or another medium capable of storing the program codes.

Optionally, in the embodiment, a processor performs the steps described below according to the program codes stored in the storage medium. A second node determines that first data sent from a first node emerges data erasure; the second node sends feedback information to the first node, where the feedback information includes one of: an erasure rate, and the erasure rate and an erasure position, the erasure rate is a proportion of resources that emerge data erasure in resources corresponding to the first data, and the erasure position is a position of the resources that emerge data erasure in the resources corresponding to the first data; the second node receives second data determined according to the feedback information by the first node; and the second node performs decoding according to the first data and the second data.

Optionally, in the embodiment, the processor performs the steps described below according to the program codes stored in the storage medium. The second node determines that the first data sent from the first node emerges the data erasure when at least one of following is checked by the second node: an equivalent received signal to interference plus noise ratio (SINR) of a signal on the resources corresponding to the first data being less than a first predetermined threshold T1; a sum of interference and noise power on the resources corresponding to the first data being greater than a second predetermined threshold T2; and a signal power on the resources corresponding to the first data being lower than a third predetermined threshold T3.

T1, T2, and T3 are real numbers.

Optionally, in the embodiment, the processor performs the steps described below according to the program codes stored in the storage medium. The resources corresponding to the first data and resources corresponding to the second data include one of: a time-frequency domain resource, a transport layer, an antenna port, and a carrier, where the time-frequency domain resource is defined by a time-domain resource having a length of N1 and a frequency-domain resource having a length of N2, and N1 and N2 are positive integers.

Optionally, in the embodiment, the processor performs the steps described below according to the program codes stored in the storage medium. A length of the time-domain resources includes: a length of one of an orthogonal frequency division multiplexing (OFDM) symbol, a time slot, a subframe and a radio frame occupied in the time-domain resource; and the length of frequency-domain resources includes a length of one of a subcarrier, a resource block (RB), and a subband occupied in the frequency-domain resource.

Optionally, in the embodiment, the processor performs the step described below according to the program codes stored in the storage medium. The time-frequency domain resource includes one of: a resource unit (RU), a resource block (RB), and a subband.

Optionally, in the embodiment, the processor performs the steps described below according to the program codes stored in the storage medium. The resources corresponding to the first data are divided into Mj mutually exclusive resource index sets according to the jth resource granularity. One of the Mj mutually exclusive resource index sets is an erasure position. Mj erasure positions form an erasure position set j. j is a positive integer, and j≤J. J is the number of erasure position sets corresponding to preset J types of resource granularity, and J is a positive integer.

Optionally, in the embodiment, the processor performs the step described below according to the program codes stored in the storage medium. In condition that the number of resource indices in the erasure position is greater than 1, the resource indices are continuous.

Optionally, in the embodiment, the processor performs the steps described below according to the program codes stored in the storage medium. The first data and the second data each are one of N redundancy versions of data, where the redundancy versions are determined according to one of: a preset erasure rate, and a combination of the preset erasure rate and a preset erasure position, and N is a positive integer.

Optionally, in the embodiment, the processor performs the steps described below according to the program codes stored in the storage medium. A first node receives feedback information sent from a second node, where the feedback information includes one of: an erasure rate, and the erasure rate and an erasure position, the erasure rate is a proportion of resources that emerge data erasure in resources corresponding to first data, and the erasure position is a position of the resources that emerge data erasure in the resources corresponding to the first data; and the first node determines second data according to the feedback information, and sends the second data to the second node, where the second data is configured for performing decoding together with the first data sent from the first node.

Optionally, in the embodiment, the processor performs the steps described below according to the program codes stored in the storage medium. The resources corresponding to the first data and resources corresponding to the second data include one of: a time-frequency domain resource, a transport layer, an antenna port, and a carrier, where the time-frequency domain resource is defined by a time-domain resource having a length of N1 and a frequency-domain resource having a length of N2, and N1 and N2 are positive integers.

Optionally, in the embodiment, the processor performs the steps described below according to the program codes stored in the storage medium. A length of the time-domain resources includes: a length of one of an orthogonal frequency division multiplexing (OFDM) symbol, a time slot, a subframe and a radio frame occupied in the time-domain resource; and the length of the frequency-domain resources includes a length of one of a subcarrier, a resource block (RB) and a subband occupied in the frequency-domain resource.

Optionally, in the embodiment, the processor performs the step described below according to the program codes stored in the storage medium. The time-frequency domain resource includes one of: a resource unit (RU), a resource block (RB), and a subband.

Optionally, in the embodiment, the processor performs the steps described below according to the program codes stored in the storage medium. The resources corresponding to the first data are divided into Mj mutually exclusive resource index sets according to the jth resource granularity. One of the Mj mutually exclusive resource index sets is an erasure position. Mj erasure positions form an erasure position set j, j is a positive integer and j≤J. J is the number of erasure position sets corresponding to preset J types of resource granularity, and J is a positive integer.

Optionally, in the embodiment, the processor performs the step described below according to the program codes stored in the storage medium. In condition that the number of resource indices in the erasure position is greater than 1, the resource indices are continuous.

Optionally, in the embodiment, the processor performs the steps described below according to the program codes stored in the storage medium. The second data is one of N redundancy versions of data, where the redundancy versions are determined according to one of: a preset erasure rate, and a combination of the preset erasure rate and a preset erasure position, and N is a positive integer.

Optionally, for specific examples in the embodiment, reference may be made to the examples described in the above embodiments and optional embodiments, and repetition will not be made herein.

Apparently, it should be understood by those skilled in the art that each of the above-mentioned modules or steps of the present disclosure may be implemented by a general-purpose computing device, the modules or steps may be concentrated on a single computing device or distributed on a network composed of multiple computing devices, and alternatively, the modules or steps may be implemented by program codes executable by the computing devices, so that the modules or steps may be stored in a storage device and executed by the computing devices. In some circumstances, the illustrated or described steps may be executed in sequences different from those described herein, or the modules or steps may be made into various integrated circuit modules separately, or multiple modules or steps therein may be made into a single integrated circuit module for implementation. In this way, the present disclosure is not limited to any specific combination of hardware and software.

The above are only preferred embodiments of the present disclosure and are not intended to limit the present disclosure. For those skilled in the art, the present disclosure may have various modifications and variations. Any modifications, equivalent substitutions, improvements and the like made within the spirit and principle of the present disclosure should fall within the scope of the present disclosure.

INDUSTRIAL APPLICABILITY

As described above, the embodiments of the present disclosure provide a data processing method, device, and node, having the following beneficial effects: the embodiments solve the problem, in the existing art, that when a decoding error occurs in a transport block, the entire transport block is retransmitted, which causes a waste of radio resources, and increases decoding complexity as well as transmission delay.

The invention claimed is:
1. A data processing method, comprising:
determining, by a second node, that a first data sent from a first node exhibits data erasure;
sending, by the second node, feedback information to the first node, wherein the feedback information comprises one of: an erasure rate, and the erasure rate and an erasure position, wherein the erasure rate is a proportion of resources that exhibit data erasure in resources corresponding to the first data, and the erasure position is a position of the resources that exhibit data erasure in the resources corresponding to the first data;
receiving, by the second node, a second data determined according to the feedback information by the first node; and
performing, by the second node, decoding according to the first data and the second data;
wherein the resources corresponding to the first data are divided into Mj mutually exclusive resource index sets according to a jth resource granularity, one of the Mj mutually exclusive resource index sets is an erasure position, Mj erasure positions form an erasure position set j, wherein j is a positive integer and j≤J. J is a number of erasure position sets corresponding to preset J types of resource granularity, and J is a positive integer; or
wherein the second data is one of N redundancy version data, wherein a redundancy version is determined according to one of: a preset erasure rate, and a combination of the preset erasure rate and a preset erasure position, and N is a positive integer.

2. The method of claim 1, wherein the second node determines that the first data sent from the first node exhibits the data erasure when the second node detects at least one of followings:
- an equivalent received signal to interference plus noise ratio (SINR) of a signal on the resources corresponding to the first data is less than a first predetermined threshold T1;
- a sum of interference and noise power on the resources corresponding to the first data is greater than a second predetermined threshold T2; and
- a signal power on the resources corresponding to the first data is lower than a third predetermined threshold T3;
- wherein T1, T2, and T3 are real numbers.

3. The method of claim 1, wherein the resources corresponding to the first data and resources corresponding to the second data comprise one of: a time-frequency domain resource, a transport layer, an antenna port, and a carrier, wherein the time-frequency domain resource is defined by time-domain resources having a length of N1 and frequency-domain resources having a length of N2, and wherein N1 and N2 are positive integers.

4. The method of claim 3, wherein
- a length of the time-domain resources comprises: a length of one of an orthogonal frequency division multiplexing (OFDM) symbol, a time slot, a subframe and a radio frame occupied in time-domain; and
- wherein the length of the frequency-domain resources comprises a length of one of a subcarrier, a resource block (RB) and a subband occupied in frequency-domain.

5. The method of claim 3, wherein
- the time-frequency domain resource comprises one of: a resource unit (RU), a resource block (RB), and a subband.

6. The method of claim 1, wherein in condition that a number of resource indices in the erasure position is greater than 1, the resource indices are continuous.

7. A data processing method, comprising:
- receiving, by a first node, feedback information sent from a second node, wherein the feedback information comprises one of: an erasure rate, and the erasure rate and an erasure position, wherein the erasure rate is a proportion of resources that exhibit data erasure in resources corresponding to a first data, and the erasure position is a position of the resources that exhibit data erasure in the resources corresponding to the first data; and
- determining, by the first node, a second data according to the feedback information, and sending the second data to the second node, wherein the second data is configured for performing decoding together with the first data sent from the first node;
- wherein the resources corresponding to the first data are divided into Mj mutually exclusive resource index sets according to a jth resource granularity, one of the Mj mutually exclusive resource index sets is an erasure position, Mj erasure positions form an erasure position set j, wherein j is a positive integer and j≤J. J is a number of erasure position sets corresponding to preset J types of resource granularity, and J is a positive integer; or
- wherein the second data is one of N redundancy version data, wherein a redundancy version is determined according to one of: a preset erasure rate, and a combination of the preset erasure rate and a preset erasure position, and N is a positive integer.

8. The method of claim 7, wherein the resources corresponding to the first data and resources corresponding to the second data comprise one of: a time-frequency domain resource, a transport layer, an antenna port, and a carrier, wherein the time-frequency domain resource is defined by time-domain resources having a length of N1 and frequency-domain resources having a length of N2, and wherein N1 and N2 are positive integers.

9. The method of claim 8, wherein
- a length of the time-domain resources comprise: a length of one of an orthogonal frequency division multiplexing (OFDM) symbol, a time slot, a subframe and a radio frame occupied in time-domain; and
- the length of frequency-domain resources comprises a length of one of a subcarrier, a resource block (RB), and a subband occupied in frequency-domain.

10. The method of claim 8, wherein
- the time-frequency domain resource comprises one of: a resource unit (RU), a resource block (RB), and a subband.

11. The method of claim 7, wherein in condition that a number of resource indices in the erasure position is greater than 1, the resource indices are continuous.

12. A non-transitory storage medium, comprising stored programs which, when executed, perform the method of claim 1.

13. A non-transitory storage medium, comprising stored programs which, when executed, perform the method of claim 7.

14. The method of claim 2, wherein the resources corresponding to the first data and resources corresponding to the second data comprise one of: a time-frequency domain resource, a transport layer, an antenna port, and a carrier, wherein the time-frequency domain resource is defined by time-domain resources having a length of N1 and frequency-domain resources having a length of N2, and wherein N1 and N2 are positive integers.

15. A terminal device, comprising:
- at least one processor; and
- a memory communicably connected with the at least one processor and configured for storing computer-executable instruction executable by the at least one processor;
- wherein the computer-executable instructions when executed by the at least one processor causes the at least one processor to perform:
- determining, by a second node, that a first data sent from a first node exhibits data erasure;
- sending, by the second node, feedback information to the first node, wherein the feedback information comprises one of: an erasure rate, and the erasure rate and an erasure position, wherein the erasure rate is a proportion of resources that exhibit data erasure in resources corresponding to the first data, and the erasure position is a position of the resources that exhibit data erasure in the resources corresponding to the first data;
- receiving, by the second node, a second data determined according to the feedback information by the first node; and
- performing, by the second node, decoding according to the first data and the second data;
- wherein the resources corresponding to the first data are divided into Mj mutually exclusive resource index sets according to a jth resource granularity, one of the Mj mutually exlcusive resource index sets in an erasure position, Mj erasure positions form an erasure position set j, wherein j is a positive integer and j≤J. J is a number of erasure position sets corresponding to preset J types of resource granularity, and J is a positive integer; or wherein the second data is one of N redundancy version data, wherein a redundancy version is determined according to one of: a preset erasure rate, and a combination of the preset erasure rate and a preset erasure position, and N is a positive integer.

16. A terminal device, comprising:

at least one processor; and a memory communicably connected with the at least one processor and configured for storing computer-executable instruction executable by the at least one processor;

wherein the computer-executable instructions when executed by the at least one processor causes the at least one processor to perform the method of claim 9.

* * * * *

UNITED STATES PATENT AND TRADEMARK OFFICE
CERTIFICATE OF CORRECTION

PATENT NO. : 10,992,426 B2
APPLICATION NO. : 16/322745
DATED : April 27, 2021
INVENTOR(S) : Zewei Chen et al.

Page 1 of 1

It is certified that error appears in the above-identified patent and that said Letters Patent is hereby corrected as shown below:

On the Title Page

In Column 2, item (57), Abstract, Line 13, after "first" delete "item of".

In the Claims

In Column 22, Line 59, Claim 1, delete "j≤J." and insert -- j≤J, --.

In Column 23, Line 59, Claim 7, delete "j≤J." and insert -- j≤J, --.

In Column 24, Line 63, Claim 15, delete "mututally" and insert -- mutually --.

In Column 24, Line 65, Claim 15, delete "mututally exlcusive" and insert -- mutually exclusive --.

In Column 24, Line 66, Claim 15, delete "forn" and insert -- form --.

In Column 24, Line 67, Claim 15, delete "j≤J." and insert -- j≤J, --.

Signed and Sealed this
Fourth Day of January, 2022

Drew Hirshfeld
*Performing the Functions and Duties of the
Under Secretary of Commerce for Intellectual Property and
Director of the United States Patent and Trademark Office*